United States Patent [19]

Repisky et al.

[11] Patent Number: 5,421,249
[45] Date of Patent: Jun. 6, 1995

[54] FOOD WEDGER

[75] Inventors: Milan Repisky, Roswell; Anton Tur, Marietta, both of Ga.

[73] Assignee: Milton Industries, Inc., Atlanta, Ga.

[21] Appl. No.: 234,186

[22] Filed: Apr. 28, 1994

[51] Int. Cl.[6] .................. A23N 3/00; A47J 17/00
[52] U.S. Cl. .................................. 99/545; 99/538; 99/543; 83/437; 83/451
[58] Field of Search .................. 99/537–545, 99/547, 555, 556, 565; 83/437, 451, 431, 620, 621, 630, 471.2, 588, 857; 30/114, 299, 302, 303, 314–316

[56] References Cited

U.S. PATENT DOCUMENTS

| 98,457 | 12/1869 | Wright | 99/545 |
|---|---|---|---|
| 262,332 | 8/1882 | Tozer | 99/545 |
| 471,158 | 3/1892 | Westerman | 99/545 |
| 507,383 | 10/1893 | O'Connell | . |
| 1,947,153 | 2/1934 | Dellinger | 146/169 |
| 4,095,518 | 9/1976 | Jones | 99/538 |
| 4,346,634 | 9/1980 | Jones | 83/431 |
| 4,372,184 | 2/1981 | Fisher | 83/98 |
| 4,436,025 | 3/1984 | Jones | 83/437 |
| 4,569,280 | 9/1984 | D'Ambro | 99/538 |
| 5,121,679 | 11/1991 | Mertz | 99/538 |
| 5,142,973 | 2/1992 | Tur | 99/538 |
| 5,337,480 | 8/1994 | Codikow | 30/114 |

FOREIGN PATENT DOCUMENTS 669232 8/1963 Canada .................. 99/545

Primary Examiner—Timothy F. Simone
Attorney, Agent, or Firm—Hopkins & Thomas

[57] ABSTRACT

A food wedger for slicing food such as apples into wedge shaped segments and coring the food comprises a frame having a base that supports a cutter assembly. The cutter assembly comprises a plurality of cutter blades radiating outwardly and upwardly from a central ring in an inverted cone-shaped radial array. The blades are fixed to the central ring and, are fixed at the periphery of the assembly to a peripheral support ring. A tapered segmented pusher having radial slots and a central pin is mounted for selective advancement through the cutter assembly. When so advanced, the blades of the assembly pass through the slots and the central pin of the pusher passes through the central ring of the cutter assembly. Food to be wedged is placed in the cutter assembly and the pusher is advanced through the cutter to force the food past the blades, which cuts the periphery of the food into wedge-shaped segments. The core of the food is, at the same time, cut away by the central ring. The food wedges are pressed completely through the cutter assembly by the pusher and the core of the food is pressed completely through the central support ring by the central pin of the pusher, thus clearing the wedger completely in preparation for successive cuts.

10 Claims, 3 Drawing Sheets

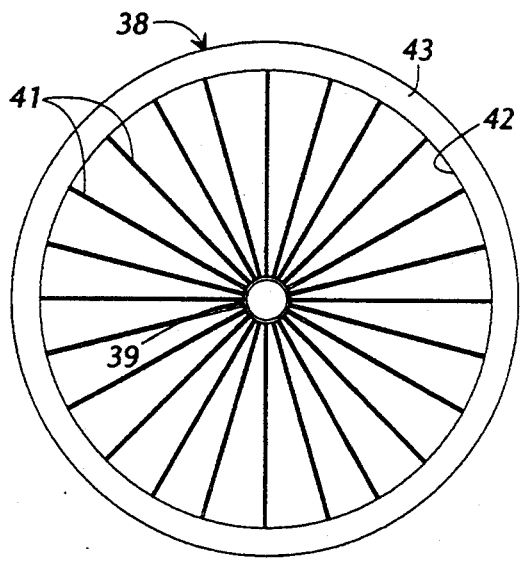
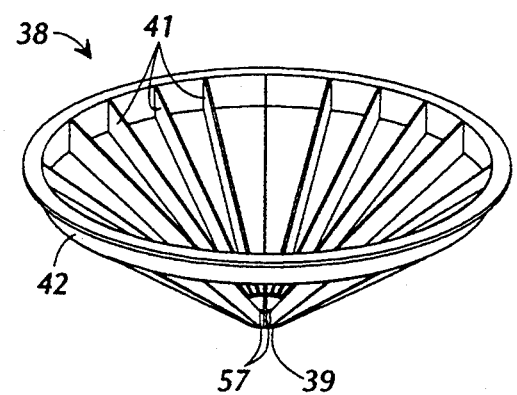
FIG. 4  FIG. 5
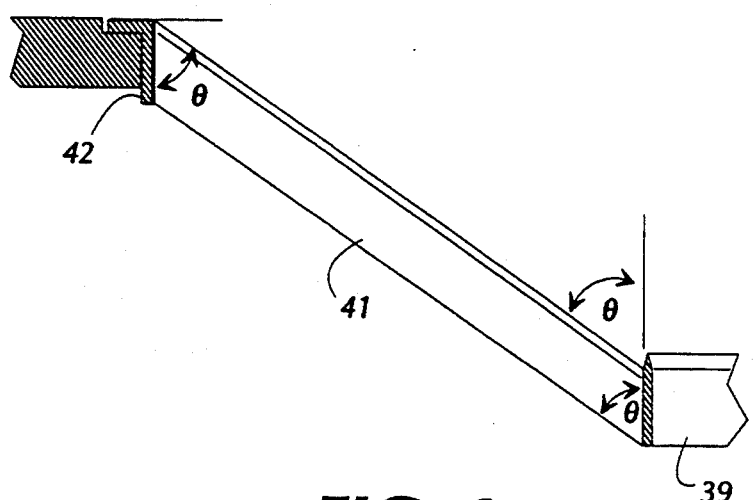
FIG. 6

FOOD WEDGER

TECHNICAL FIELD

This invention relates in general to food processing devices and more particularly to devices for cutting or slicing food such as fruit into wedge-shaped segments for presentation to a consumer.

BACKGROUND

In the food processing industry, more particularly the restaurant industry, it is often necessary to cut or slice food such as fruit into wedge shaped segments for presentation to a consumer. Such wedging is commonly applied to apples, oranges, limes, lemons, and similar types of fruit.

The prior art is replete with devices for slicing food into wedge shaped segments. In U.S. Pat. No. 4,095,518 of Jones, for example, a food article is divided into a number of radial sections by forcing it through a conical cup of radial blades within which the food article is impaled on a central spike. The food article is forced through the radial cup of blades by a wire frame plunger assembly having legs that extend through the spaces between the blades. The plunger presses the food article through the blades thus slicing it into wedge shaped pieces. The problem with the Jones apparatus and similar devices, however, is that the core of the food item being wedged remains intact as part of the wedged pieces. In many fruits, such as apples, this core is inedible and must be cut from the wedges after the food item has been wedged.

A produce wedger of similar operation is shown in U.S. Pat. No. 4,569,280 of D'Ambro et al. In this device, a conical blade assembly is movable through a slotted perch. A food item to be wedged is placed on the perch and the blades are moved through the perch to slice the food item into wedged segments. As with the Jones device, the D'Ambro et al apparatus also successfully sections a food item but leaves the core of the food item intact. If the food item is such that the core is inedible, the core must again be manually removed from each of the wedge shaped sections prior to serving.

Finally, U.S. Pat. No. 5,142,973 of Tur et al shows an onion cutter that slices an onion into sections to produce a blossom-like shape that can be battered, fried, and served. While this device successfully cuts onions in this fashion, it nevertheless is not designed to and cannot slice an onion or any other food product into separate wedge shaped segments.

Accordingly, there exists a continuing and heretofore unaddressed need for food wedger that effectively, efficiently, and quickly slices food items such as apples into wedge shaped segments while simultaneously removing the core from the food item. Such a device should be compact, simple to use, easily cleanable, and should reliably remove the core from a food item each time such an item is sliced into wedge shaped sections. The wedged peripheral portion of the food item and the severed core should pass completely out of the machine after wedging. It is to the provision of such a food wedger that the present invention is primarily directed.

SUMMARY OF THE INVENTION

Briefly described, the present invention, in one preferred embodiment thereof, comprises a food wedger for slicing food items such as fruit into wedge shaped sections while simultaneously coring the food items. The wedger of the present invention comprises a frame having a substantially horizontally oriented base supported above a surface on legs. A cutter assembly is mounted in the base and has an open central ring from which a plurality of sharpened cutter blades outwardly extend in a radial array. The central ring of the cutter assembly forms a hub and the cutter blades extend outwardly and upwardly from the central ring to form a substantially cone shaped cutter assembly having blades that are sharpened on the internal side of the cone. The ends of the blades are fastened around a larger support ring that, in turn, is mounted in the base.

A plunger is mounted on the frame for vertical movement toward and away from the cutter assembly generally along the axis thereof. The plunger is substantially frustroconical in shape, having a narrower top end and a wider bottom end. An array of radially extending slots is formed in the bottom end of the plunger and a central pin sized to fit through the central ring of the cutter assembly is disposed along the central axis of the plunger. The slots are sized and arrayed to receive the blades of the cutter assembly as the plunger is moved toward and through the assembly and, at the same time, the central pin of the plunger moves through the central ring of the cutter assembly.

In operation, a food item such as an apple is positioned in the cone shaped cutter assembly with its core substantially aligned along the axis of the assembly. The plunger is then forced downwardly toward and through the cutter assembly. This presses the food item through the cutter assembly. In moving through the cutter assembly, the peripheral portions of the food item are sliced into wedge shaped segments by the radial blades while the core of the food item is severed and cut away by the central ring of the cutter assembly.

As the plunger continues to press the food item through the cutter assembly, the blades of the cutter assembly move into the slots of the advancing plunger. At the same time, the plunger's central pin moves through the central ring of the cutter assembly. Eventually, the entire lower portion of the plunger moves through the cutter assembly pushing the wedged and cored food item completely out of the wedger. The wedges and core then fall to the counter on which the wedger rests and the core can simply be removed and discarded leaving only edible wedges for presentation to a consumer. Springs are provided to bias the plunger back up, out of, and away from the cutter assembly in preparation for subsequent wedging of other food items.

Thus, an improved food wedger is now provided that addresses and solves problems and shortcomings of prior art wedgers. In particular, this invention is compact, convenient to use, and reliably slices food items such as apples into wedge shaped segments while simultaneously removing their inedible cores. The segments and the core are pressed completely out of the machine where the core can be discarded and the segments collected for presentation. The frustroconical plunger with central pin and radiating slots insures that the entire food item is pressed uniformly through the cutter blades to avoid deforming, bruising, or otherwise damaging the food item. These and additional advantageous objects and features of this invention will become more apparent upon review of the detail description set forth below taken in conjunction with the accompanying drawings, which are described briefly as follows.

BRIEF DESCRIPTION OF THE DRAWINGS

FIG. 4 is a top elevational view of the radially arrayed cutting blade assembly of this invention.

FIG. 5 is a perspective view of the cutting blade assembly shown with some of the blades removed to illustrate the configuration of the central support ring.

FIG. 6 is an illustration of one of the blades of the cutting blade assembly showing the relationship between the blade configuration and the peripheral and central support rings of the assembly.

DETAILED DESCRIPTION OF THE PREFERRED EMBODIMENT

Figure 1:
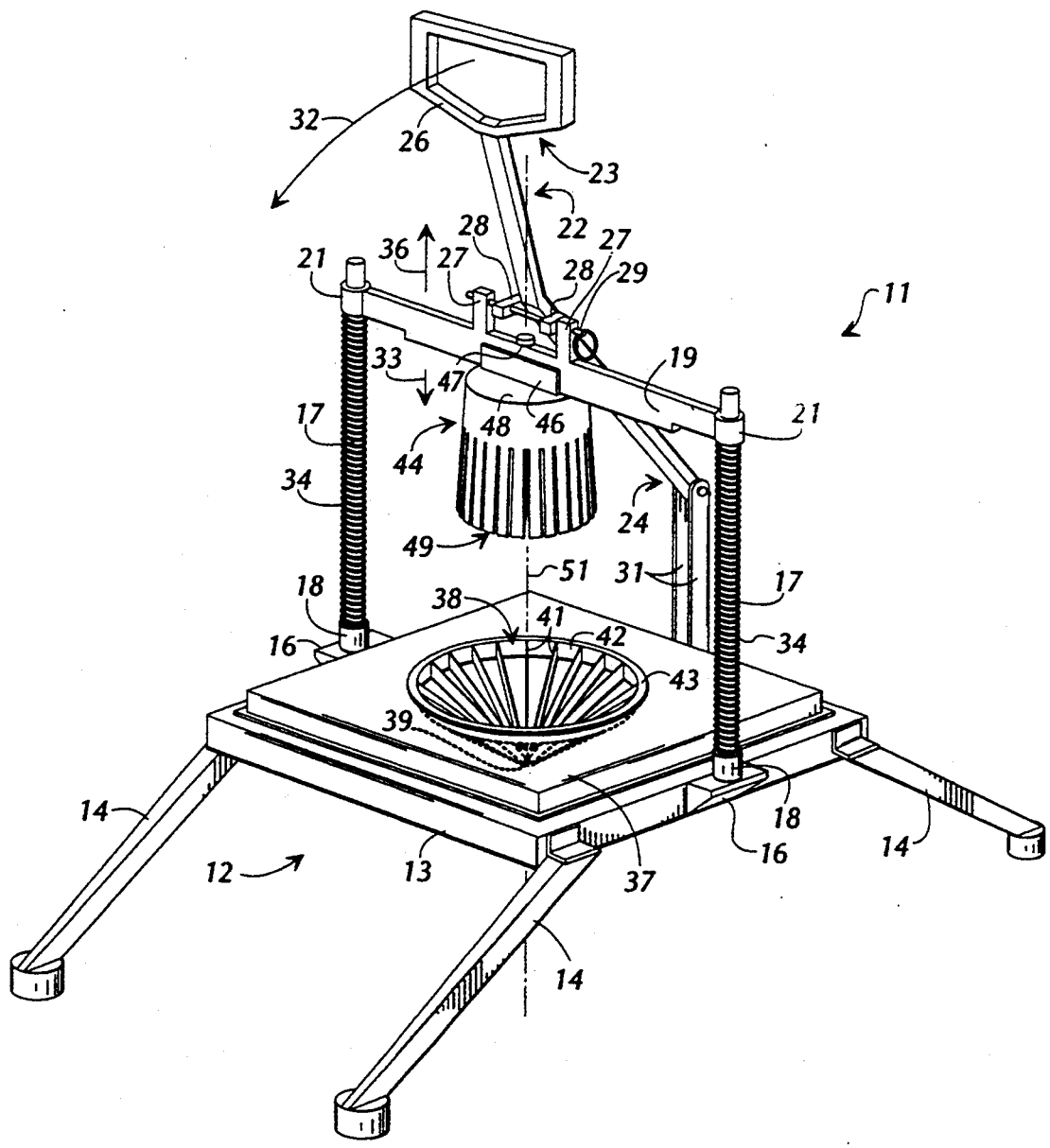
FIG. 1 is a perspective view of a food wedger that embodies principles of the present invention in a preferred form.

Referring now in more detail to the drawings, in which like numerals refer to like parts throughout the several views, FIG. 1 illustrates in perspective a food wedger that embodies principals of the present invention in a preferred form. The wedger 11 comprises a frame 12 having a base 13 that is supported above a surface by four support legs 14. A pair of ears 16 project from opposing sides of the base 13 and support a corresponding pair of vertically extending guide rods 17. The guide rods 17 are journaled at their bottom ends into respective support brackets 18 that, in turn, are anchored to the tops of the ears 16.

An elongated plunger arm 19 extends generally between the guide rods 17 and is vertically movably mounted on the guide rods by a pair of sleeve bearings 21. Preferably, the sleeve bearings 21 are formed as an integral part of the plunger arm 19 and are fitted with appropriate internal bushings to insure that the plunger arm 19 is firmly fixed to the guide rod 17 but yet moves easily up and down the guide rods. An elongated handle arm 22 has a first end 23 and a second end 24. The handle arm 22 terminates at its first end 23 in a handle 26 and is pivotally secured intermediate its ends to the top of the plunger arm 19. More specifically, the plunger arm 19 is formed with a pair of upstanding tangs 27. A pair of dogs 28 are welded or otherwise secured to the handle arm 22 and extend laterally therefrom to distal ends that are disposed between the upstanding tangs 27 of the plunger arm 19. Pins 29 extend through each of the dogs and its corresponding tang so that the dogs and the handle arm are pivotally secured to the tangs and the plunger arm as shown.

The handle arm 22 is pivotally secured at its second end 24 to a pair of elongated linkage arms 31 that, in turn, are pivotally secured at their lower ends to the frame 13. With this arrangement, it can be seen that the handle 26 can be grasped in the hand of a user and forced downwardly in the direction of arrow 32. This action, in turn, forces the plunger arm 19 to move vertically downwardly in the direction of arrow 33. A pair of coil springs 34 are disposed about the guide rods 17 and extend between the support brackets 18 and respective ones of the sleeve bearings 21. The coil springs 34 function to bias the plunger arm 19 to its upward position on the guide rod 17. Thus, when the plunger arm 19 has been moved downwardly by manipulation of the handle 26 and the handle released, the plunger arm 19 is moved by the coil springs 34 back up in the direction of arrow 36 to its upwardly disposed position as shown in FIG. 1.

A cutter plate 37 is supported on the base 13 and bears a cutter assembly 38. The cutter assembly 38 comprises a substantially cylindrical central ring 39 defining an opening therethrough. A plurality of cutting blades 41 are fixed at their ends about the periphery of the ring 39 and extend upwardly and outwardly therefrom in a generally radial array. The orientation of the blades 41 forms a generally upwardly open cone shaped configuration for the cutter assembly and the blades 41 are sharpened along their edges disposed on the internal side of the cone. The upper peripheral edge of the ring 39 is also sharpened so that the ring functions as a cylindrical blade.

The distal ends of the radially arrayed blades 41 are fixed to a peripheral support ring 42 that, in turn, is formed with an annular lip 43. The lip 43 rests on the cutter plate 37 and supports the cutter assembly 38 within the circular opening formed in the cutter plate 37.

A plunger 44 is secured by a bracket 46 and bolt 47 to the plunger arm 19 and depends downwardly therefrom. The plunger 44 has a generally frustroconical shape with a relatively smaller upper end portion 48 and a relatively larger lower end portion 49. The plunger 44 is mounted on the plunger arm 19 so that the plunger's vertical axis of symmetry is aligned substantially along the axis of symmetry of the cutter assembly, designated generally at 51.

Figure 2:
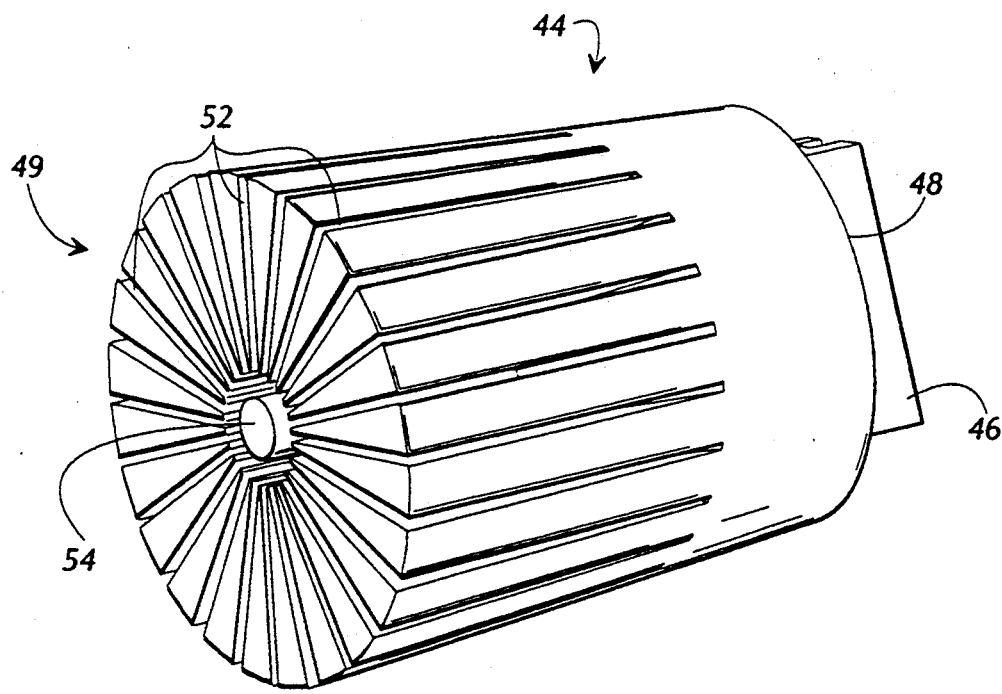
FIG. 2 is a perspective view of the tapered segmented pusher of this invention illustrating the central pusher pin thereof.

As best seen in FIG. 2, the plunger 44 is formed with a plurality of slots 52 that radiate outwardly from a longitudinally extending central opening 53. The number of slots in the plunger 44 correspond to the number of blades in the cutter assembly 38. Further, the slots 52 are positioned to receive the blades 41 of the cutter assembly 38 when the plunger 44 is moved downwardly in the direction of arrow 33 (FIG. 1) to and partially through the cutter assembly 38.

Disposed along the longitudinal axis of the plunger 44 within the central opening 53 is an elongated cylindrical pin or rod 54. The pin 54 has a diameter that is slightly less than the diameter of the opening formed by the central ring 39 of the cutter blade assembly. It will thus be appreciated that as the plunger 44 is moved downwardly toward and through the cutter assembly 38, the blades of the assembly move into and through the slots 52 while the pin 54 passes through the opening in the center of the cutter assembly formed by the ring 39. In this way, a food item that is processed with the present invention is pressed by the plunger completely through the cutter blade assembly as discussed in more detail below.

Figure 3:
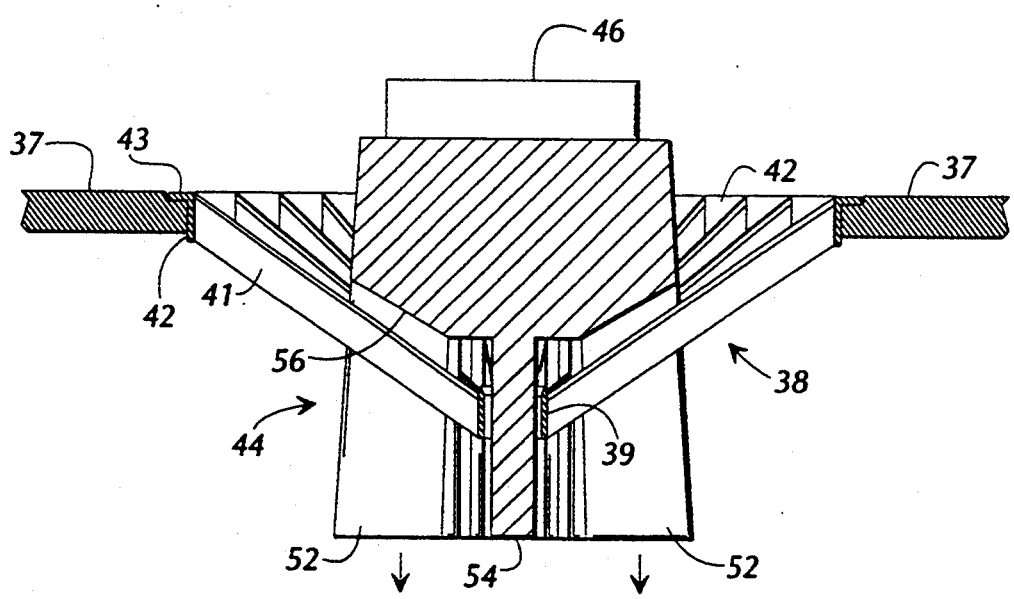
FIG. 3 is a sectional view illustrating the relative positions and relationship between the pusher and the blade assembly following a cutting stroke of the food wedger.

FIG. 3 is a sectional view showing the relative positions of the cutter blades 41, central ring 39, and slots 52 when the plunger 44 is fully inserted through the cutter assembly 38. As can be seen from this figure, the floors 56 of the slots 52 are angled to correspond to the angle of the blades 41 so that the plunger 44 can pass fully through the cutter blade assembly 38. In addition, the central pin 54 is seen to extend fully through the central ring 39 of the cutter assembly so that the entire lower portion of the plunger 44 passes through and beneath the cutter assembly 38 on the downward or cutting stroke of the machine.

FIG. 4 is a top elevational view of the cutter assembly 38 showing the plurality of cutter blades 41 disposed in a radial array about support ring 39 and fixed at their distal ends to peripheral support ring 42.

FIG. 5 is a perspective view of the cutter assembly 38 shown with some of the cutter blades 41 removed for clarity. Preferably, the central support ring 39 of the cutter assembly is formed with axially aligned slots disposed around its outer surface to receive the ends of the blades 41 and position them properly about the ring 39. Once received into the slots 57, the cutter blades 41 can be welded or otherwise fixed to the ring by any appropriate fastening means. The distal ends of the cutter blades 41 are welded or otherwise fixed to the peripheral support ring 42, which supports the ends of the blades and supports the entire cutter assembly on the cutter plate 37 as shown in FIG. 1.

FIG. 6 illustrates the relationship between the blades 41, the central support ring 39, and the peripheral support ring 42. Each of the blades is seen to have ends that are formed at an angle theta with respect to the length of the blade. With this configuration, the blade, when fixed to the rings 39 and 42, makes an angle theta with the vertical as shown in FIG. 6. With each of the blades 41 of the array forming such an angle, the cutter blade assembly takes the shape of an inverted cone with the blades being sharpened on the interior side of the cone. In this way, each of the blades slices at an angle through a food item forced through the cutter assembly for a more efficient and a cleaner cut.

OPERATION

In using the apparatus of the present invention to slice a food item into wedge shaped segments and simultaneously core the food item, the food item, such as an apple, is placed in the cone-shaped cutter assembly with the core of the item aligned substantially along the vertical axis of the cutter assembly. The handle 26 is then grasped by the user and pulled down in the direction of arrow 32. This moves the plunger 44 downwardly until it engages the food item. Further downward movement of the handle 26 imparts a downward force to the food item and begins to press the food item through the cutter assembly 38. As the food item is pressed through the cutter assembly, its peripheral portion is pressed downwardly by the relatively larger lower end 49 of the plunger while its central portion or core is pressed downwardly by the pin 54. The peripheral portion of the food item is thus cut into wedge shaped pieces by the blades 41 while a cylindrical cut is made through and about the core of the food item by the ring 39.

Upon continued downward movement of the plunger, the blades 41 eventually encounter and move into the slots 52 formed in the plunger. As this happens, the food item begins to be pushed by the plunger completely through the cutter blade assembly. Further progressive movement moves the blades further into the slots until the pin 54 encounters and moves through the central opening in the ring 39, thus pushing or pressing the core of the food item through the ring.

When the plunger completely clears and passes through the cutter assembly as shown in FIG. 3, the food item is pressed completely past the assembly and falls on the counter below the wedger 11. The results of the operation are a number of wedge shaped pieces that have been cut from the peripheral portion of the food item and a cylindrical shaped core that has been cut by the central ring of the cutter assembly. In many food items, such as apples, the core is inedible and can simply be discarded. Conversely, since the core has been cut from the food item, none of the inedible core remains attached to the wedge-shaped pieces so that these pieces require no further processing and can be served immediately to a consumer or otherwise used for their intended purpose.

With the food item thus completely sliced and cored, the handle is released and the springs 34 raise the plunger back up to its initial position spaced from the cutter assembly in preparation for the insertion and wedging of subsequent food items.

The invention has been described herein in terms of preferred embodiments and methodologies. It will be clear to those of skill in this art, however, that various modifications might be made to the illustrated embodiments within the scope of the invention. For example, the cutter assembly might be constructed with a larger or smaller central ring to suit the size of cores of a particular food item being wedged. Also, fewer or greater numbers of cutter blades 41 and correspondingly fewer or greater numbers of slots 52 can be provided to produce wedges of any desired size. Also, various frames, bases, and support means might be used to align the plunger with the cutter assembly and force the plunger to and through the assembly, the illustrated embodiment being only a preferred expedient. These and other additions, deletions, and modifications might well be made to the illustrated embodiment without departing from the spirit and scope of the invention as set forth in the claims.

We claim:

1. An apparatus for slicing a work piece into wedge-shaped segments, said apparatus comprising:
   a frame;
   a cutter assembly supported on said frame, said cutter assembly having a central hub member with an opening formed therethrough and a plurality of cutting blades extending outwardly from said central hub member in a generally radial array defining wedge-shaped spaces between said cutting blades;
   a pusher movably mounted on said frame for pushing the work piece through said cutter assembly to slice the workpiece into wedge-shaped segments, said pusher being formed with a radial array of slots into which said cutting blades progressively move when said pusher is advanced through said cutter assembly;
   pin means on said pusher with said pin means being sized and positioned to move through the opening formed in said central hub of said cutter assembly as the pusher is advance through the cutter assembly; and
   articulated means on said frame for selectively advancing said pusher toward and at least partially through said cutter assembly to press the work piece through said cutter assembly thus slicing the workpiece into wedge shaped segments, and means for retracting said pusher from said cutter assembly when the work piece has been pressed therethrough.

2. An apparatus for slicing a work piece into wedge-shaped segments as claimed in claim 1 and wherein said hub member of said cutter assembly is formed as a substantially annular ring having an exterior surface and an interior surface defining said central opening and wherein said cutting blades are each fixed at one end to the exterior surface of said ring, said cutting blades radiating outwardly from said annular ring.

3. An apparatus for slicing a work piece into wedge-shaped segments as claimed in claim 2 and wherein said pin means comprises a generally cylindrical rod.

4. An apparatus for slicing a work piece into wedge-shaped segments as claimed in claim 1 and wherein said cutting blades radiate outwardly and upwardly from said central hub forming a truncated cone configuration of said cutter assembly.

5. An apparatus for slicing a work piece into wedge-shaped segments as claimed in claim 4 and wherein said central hub member of said cutter assembly is formed as a substantially annular ring having an exterior surface and an interior surface defining said central opening and wherein said cutting blades are each fixed at one end to the exterior surface of said ring, said cutting blades extending outwardly from said annular ring to distal ends.

6. An apparatus for slicing a work piece into wedge-shaped segments as claimed in claim 5 and wherein said distal ends of said cutting blades define a periphery of said cutter assembly and wherein said apparatus further comprises a support ring extending about the periphery of said cutter assembly, said distal ends of said cutting blades being fixed to said support ring.

7. An apparatus for slicing a work piece into wedge-shaped segments as claimed in claim 1 and wherein said pusher has a tapered frustroconical body having a longitudinal axis and defining a smaller top end of said pusher and a larger bottom end of said pusher, said slots being formed in said larger bottom end of said pusher, said articulated means being adapted to advance said pusher bottom-end-first toward and at least partially through said cutter assembly with the cutting blades of said assembly moving into said slots to press the work piece through the cutter assembly.

8. An apparatus for slicing a work piece into wedge-shaped segments as claimed in claim 7 and wherein said pin means comprises a generally cylindrical rod extending along the longitudinal axis of said pusher and being sized and positioned to extend through said central opening in said hub member as said pusher advances through said cutter assembly.

9. A food item wedger comprising a frame, a conical cup of internally sharp radially arrayed blades mounted in said frame with said blades defining substantially wedge-shaped spaces therebetween, said blades being arrayed about a central support ring that defines an opening at the apex of said conical cup of blades, a plunger mounted on said frame for reciprocal movement toward and away from said blades for pressing a food item through the radial array of blades to wedge the food item, said plunger having a plurality of radially arrayed slots into which said blades are received as said plunger is advanced progressively through said array of blades and a central pin sized and positioned to pass through said opening defined by said support ring as said plunger is advanced through said array of blades, whereby the peripheral portion of the food item is sliced into wedge-shaped segments by the radially arrayed blades and the core of the food item is removed from the peripheral portion of the food item by the central support ring, the wedge-shaped segments and the core being pressed completely through the radial array of blades by the advancing plunger.

10. A food item wedger as claimed in claim 9 and wherein said plunger has a tapered frustroconical body defining a smaller top end of said plunger and a larger bottom end of said plunger, said radially arrayed slots being formed in said larger bottom end of said plunger, said plunger being mounted for movement bottom-end-first toward said radial array of blades.

* * * * *